Sept. 8, 1942.    R. G. LECLERCQ    2,295,223
NONFLOOD COVER FOR STORAGE BATTERY CELLS
Filed Aug. 26, 1939

INVENTOR.
RAYMOND G. LECLERCQ
BY
ATTORNEYS.

Patented Sept. 8, 1942

2,295,223

UNITED STATES PATENT OFFICE 2,295,223

NONFLOOD COVER FOR STORAGE BATTERY CELLS

Raymond G. Le Clercq, Los Angeles, Calif., assignor to Pacific Hard Rubber Company, Los Angeles, Calif., a corporation of California Application August 26, 1939, Serial No. 292,123

5 Claims. (Cl. 136—178)

This invention relates to a non-flood cover for storage battery cells and is a continuation-in-part of my co-pending application for Letters Patent of the United States, filed March 13, 1939, Ser. No. 261,556. The object, expressed by its title, is to devise a cover which precludes the issuance of electrolyte from the filling tube of the cell under the pressure influence of gas formed during charging of the battery. Stated more particularly, the invention is one providing a filling tube depending below the ceiling of the cell and defining, by its lower limit, the filling level of the cell, in association with means by which the gas pocket which surrounds the tube is sealed from and vented to the atmosphere during periods at which the cell is being filled and charged, respectively.

With the foregoing and further still more particular objects and advantages in view which will appear in the course of the following detailed description and claims, the invention consists in the novel construction and in the adaptation and combination of parts hereinafter described and claimed.

In the drawing—

Figure 4:
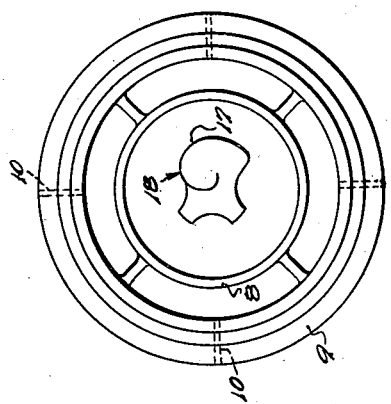
Fig. 4 is an underside plan view of the closure cap.

The battery cover is denoted in the drawing by the numeral 6 and is or may be conventional in its provision of post openings for the positive and negative terminals of the cell plates as well as in the employment of a flanged edge which fits the inner wall of the battery case and produces therewith a peripheral channel for the reception of sealing compound. It may be also stated, while illustrating my cover as being formed with a surface basin surrounding the upper end of the filling tube 7 and acting in conjunction with an annular partitioning apron 8 carried by the closure cap 9, the apron depending in the seated position of the cap slightly below the level of the liquid in the basin to produce a gas trap, that the present advancements are entirely independent of this trap and may be applied with equal efficiency to filling tubes having direct access to the vents 10 of the cap.

Describing in detail the improvements which characterize the present invention, the filling tube depends into the cell to a distance defining the correct filling level thereof and is formed at one side with a flattened exterior face serving as a seat for a transom valve 11 operating as a closure for a vertical channel 12 leading upwardly from the lower limits of the tube to a port 13 communicating with the interior of the latter, said valve being held against its seat by the contractive influence of an elastic band 14 which encircles the tube and fits a transverse slot 15 cut in the rear face of the valve. The lower or heel portion of the valve operates as a fulcrum about which the valve, in opposition to said band, is deflected outwardly from its seat by the action of a cam which engages a tongue element 11' formed integral with the valve and extending therefrom through the port into the interior of the tube. The upper toe portion of the valve complements the tongue to maintain the valve against lateral displacement, such toe engaging in a cavity 16 provided in the underside of the cover and being guidably held by the side walls of the cavity to a fore-and-aft movement. While desirably of lead, the valve may be produced from any other suitable material resistant to acid attack.

Figure 2:
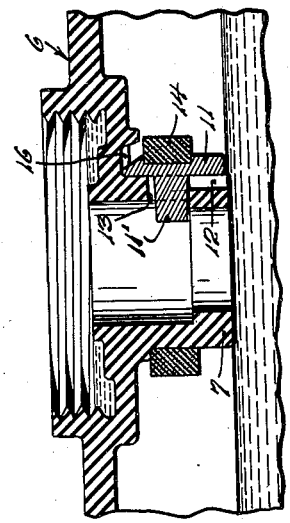
Fig. 2 is a similar section with the cap removed.
Figure 3:
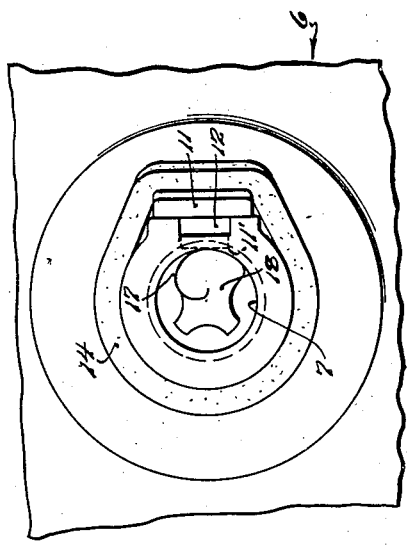
Fig. 3 is an underside plan view of the cover and cap, indicated by the direction arrows 3—3 of Fig. 1.
Figure 1:
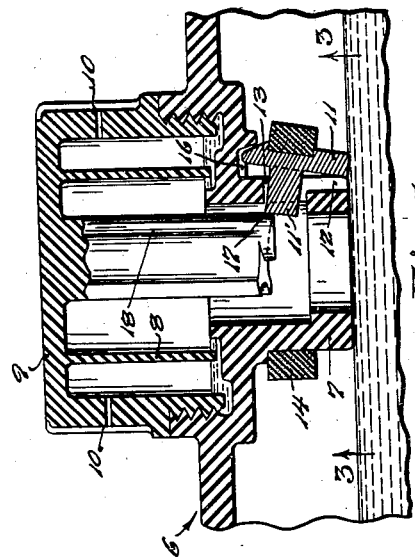
Figure 1 is a fragmentary longitudinal vertical section illustrating a cell cover and complementary closure cap constructed according to the present invention.
Figure 5:
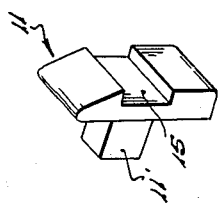
Fig. 5 is a perspective view illustrating the valve employed in the assembly.

The cam referred to above is formed as an eccentric development of the side wall 17 of a pendant leg 18 which is produced integral with the cap 9, such leg also providing a pair of reinforcing ribs lying diametrically opposite from the cam. Said leg is of a length such as to project the cam, in the fully seated position of the cap, a distance below the upper limits of the tongue corresponding generally to the thread pitch of the cap, in consequence of which a complete turn of the cap in the retraction of the latter elevates the cam sufficiently to have its underneath facing surface pass over the tongue. As can be best seen from an inspection of Fig. 2, the port 13 must of necessity be prolonged upwardly beyond the plane occupied by the upper edge of the tongue in the seated position of the valve to permit the tongue to be tilted about the heel of the valve as a fulcrum. It will likewise be apparent that the point at which such valve takes its purchase must be relatively constant, in other words the valve must be prevented from shifting vertically in relation to the filling tube. To accomplish this end I form the underneath surface of the leg such that the same describes a clockwise spiral face receding to a degree substantially corresponding to the pitch which characterizes the cap threads, the result being that the underside of the two reinforcing ribs of the leg and the cam itself are each caused, by the act of unscrewing the cap, to progressively track over the upper edge of the tongue and thereby position the seated tongue in a predetermined position relative to the port.

It will of course be apparent that removal of the cap 9 causes the valve to seat in that the elastic band is permitted to exert its contractive influence upon the same. So seated, the cell may be filled with water only to the filling level defined by the tube's lower end. As the cap is applied to the cover the tongue of the valve is deflected outwardly by the action of the cam surface 17 with resulting communication for the escape of gases from the cell to the interior of the tube.

Numerous modifications from the preferred embodiment illustrated and herein described might obviously be resorted to and it is therefore my intention that the language of the hereto annexed claims be interpreted with a breadth commensurate with the state of the advance in the art.

What I claim is:

1. In a storage battery cell containing electrolyte and having a hermetically sealed cover: a filling tube depending from the cover into the cell to the normal electrolyte level, said tube acting to produce a gas pocket about the same and having a gas port in the side wall located above said electrolyte level and leading from the gas pocket to the interior of the tube; a rocker-type valve seating against the external wall of the tube and operating about its heel as a horizontal fulcrum into and from closure relation to the port, said valve having a tongue reduced in its vertical dimension from that of the port and extending through the latter into the interior of the tube; yielding means engaging the valve for influencing the valve into port-closing position; and a vented closure cap for the filling tube rotatively associated therewith and formed with a stem depending into the tube and into engagement with the tongue, the side wall of said stem being produced in the nature of a cam functioning by rotative movement of the cap into tube-closing position to express the tongue outwardly in opposition to the yielding means for moving the valve from its seated position.

2. In combination with a non-flood cover for storage battery cells, the cover providing a depending filling tube adapted to define the normal electrolyte level of a battery cell with which the same is used, said tube having an external vertical channel and providing an opening leading from the floor of the channel to the interior of the tube; a transom-type valve arranged to overlie the channel as a closure for the marginal edges thereof and provided with a tongue element reduced in its cross sectional dimensions from that of the opening and projecting through said opening into the interior of the tube; an elastic band encircling the tube and engaging the valve to influence the valve into its channel-closing position; and a vented closure cap for the filling tube threadedly applied to the cover and formed with a stem functional to the tongue and arranged to depend into the tube, said stem acting by rotary threading of the cap into seated position on the cover to exert an expansive force upon the tongue operative to open the valve in opposition to the elastic band by the act of tilting the valve about an edge thereof as a fulcrum.

3. In combination with a non-flood cover for storage battery cells, the cover being characterized in that the same is formed with a depending filling tube adapted to define the normal electrolyte level of a battery cell with which the same is used and having an opening in the wall of said tube; a valve seating over the external wall of the tube in overlying relation to said opening, said valve being formed with a tongue element having clearance relative to the margins of the opening and projecting through the opening into the interior of the tube; yielding means engaging the valve to influence the valve into its seated position; and a vented closure cap for said filling tube threadedly applied to the cover and formed with a stem depending into the tube, the side wall of said stem being eccentric to the axis of the cap and by rotary threading of the cap into seated position on the cover functioning as a cam to express the tongue outwardly in opposition to the yielding means for moving the valve from its seated position.

4. A construction according to claim 3 in which the seat for the valve is planed to a tangent of a circle concentric with the axis of the tube.

5. In combination with a non-flood cover for storage battery cells, the cover being characterized in that the same is formed with a depending filling tube adapted to define the normal electrolyte level of a battery cell with which the same is used, said tube having an opening in the wall for passage of electrolyte gases and being formed at the admission end of said opening with an external valve seat planed to a tangent of a circle concentric with the axis of the tube; a rocker-type valve seating against said valve seat and operating about a marginal edge as a fulcrum into and from closure relation to the gas opening, said valve having a tongue element providing clearance relative to the margins of the gas opening and projecting through said opening into the interior of the tube; yielding means engaging the valve for influencing the same into its seated position; and a vented closure cap for the filling tube formed with a cam element functional to the tongue arranged to depend into the tube and adapted by application of the cap into its tube-closing position to exert an expansive force upon the tongue operative to express the tongue outwardly and cause the valve to open in opposition to the yielding means.

RAYMOND G. LE CLERCQ.